(12) United States Patent
Peak (10) Patent No.: US 7,379,581 B2
(45) Date of Patent: May 27, 2008

(54) METHOD FOR RECOGNIZING A PATTERN OF AN ALIGNMENT MARK ON A WAFER

(75) Inventor: Jong-Sun Peak, Guri-si (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 835 days.

(21) Appl. No.: 10/617,766

(22) Filed: Jul. 14, 2003

(65) Prior Publication Data

US 2004/0037458 A1    Feb. 26, 2004

(30) Foreign Application Priority Data

Aug. 20, 2002    (KR) ................. 2002-49261

(51) Int. Cl.
    G06K 9/00    (2006.01)
    G06K 9/36    (2006.01)
(52) U.S. Cl. ..................... 382/151; 382/287
(58) Field of Classification Search ............. 382/151, 382/287
    See application file for complete search history.

(56) References Cited

U.S. PATENT DOCUMENTS

| 4,566,125 A | * | 1/1986 | Clunn ................ 382/151 |
| 5,272,763 A | * | 12/1993 | Maruyama et al. ........ 382/147 |
| 6,072,915 A | * | 6/2000 | Tanaka ................ 382/287 |
| 6,278,957 B1 | * | 8/2001 | Yasuda et al. ........... 702/150 |
| 6,295,120 B1 | * | 9/2001 | Miyatake ............... 355/53 |

FOREIGN PATENT DOCUMENTS

KR    1999-0034411    5/1999

* cited by examiner

Primary Examiner—Bhavesh M. Mehta
Assistant Examiner—Kathleen Yuan
(74) Attorney, Agent, or Firm—Lee & Morse, P.C.

(57) ABSTRACT

A method for recognizing a pattern of an alignment mark on a wafer includes positioning the wafer on an adjustable wafer stage in an alignment apparatus; capturing images of a key alignment mark by magnifying an alignment mark region of the wafer; deleting image data from a region where the alignment pattern does not exist between the captured images; and extracting an alignment mark pattern by a pattern recognition of the remaining image data after the deletion of the image data. Thus, an alignment failure can be reduced because a particle on the wafer is not mistaken as an alignment mark.

13 Claims, 6 Drawing Sheets

METHOD FOR RECOGNIZING A PATTERN OF AN ALIGNMENT MARK ON A WAFER

BACKGROUND OF THE INVENTION

1. Field of the Invention

The present invention relates to a method for recognizing a pattern of an alignment mark on a wafer. More particularly, the present invention relates to a method for recognizing a pattern of an alignment mark on a wafer in a measurement system during an initial set-up step.

2. Description of the Related Art

In the semiconductor industry, very large and expensive instruments are required from the initial manufacturing step of a semiconductor manufacturing line. Thus, it is important that the number of failures generated during a semiconductor manufacturing process should decrease in accordance with developments in the manufacturing technique in order to reduce the cost of the semiconductor manufacturing process. To reduce the number of failures in the semiconductor manufacturing process, measurement apparatuses are used to measure parameters relative to a wafer at a series of points in the semiconductor manufacturing line. In particular, the measurement of the parameters of the wafer becomes increasingly important as semiconductor devices become more highly integrated and have increasingly minute structures.

During the semiconductor manufacturing process, films are repeatedly deposited on a wafer and repeatedly etched. Frequently, a measurement apparatus is used to measure a thickness of the deposited film, an etched depth of the film, and a thickness of the remaining film. When the measurement apparatus measures such parameters relative to the wafer, the position and the amount of the film on the wafer are critical.

After the measurement apparatus measures the parameters of the wafer, a charge coupled device (CCD) camera, for example, is used to detect an image of an alignment mark. The detected image is then utilized as the reference data. During this process, a user should repeatedly reset the measurement apparatus for recognizing a pattern on the wafer or the measuring process may be skipped due to a measurement failure if a pattern recognition failure by the measurement apparatus occurs.

For example, it becomes significant that a measurement failure may occur at about 200 points in a semiconductor manufacturing line when the measurements of the wafer are performed at about 500 points of the semiconductor manufacturing line.

In operation, the measurement apparatus recognizes an alignment pattern in an initial setting step, and performs an alignment of the wafer with reference to the recognized alignment pattern. Thus, a measurement failure is generated when a pattern recognition failure occurs in the initial setting step.

In a conventional measurement apparatus, the alignment failure is typically generated when a particle on the wafer is mistaken for a pattern because the alignment set-up is performed to detect an image in a wide alignment region at a low magnification.

SUMMARY OF THE INVENTION

The present invention has been made in an attempt to solve at least some of the aforementioned problems. Accordingly, it is a feature of an embodiment of the present invention to provide a method for recognizing an alignment mark on a wafer by a precise pattern recognition of the alignment mark after highly magnifying and detecting a key alignment mark in an alignment mark region of the wafer.

In order to provide the feature of an embodiment of the present invention, there is provided a method for recognizing a pattern of an alignment mark on a wafer including positioning the wafer on an adjustable wafer stage in an alignment apparatus; capturing images of a key alignment mark by magnifying an alignment mark region of the wafer; deleting image data from a region where the alignment pattern does not exist between the captured images; and extracting an alignment mark pattern by a pattern recognition of the remaining image data after the deletion of the image data.

Preferably, the key alignment mark is magnified by at least about four magnifications. In addition, a related pattern is recognized during a set-up of the measurement apparatus for measuring parameters relative to a particle on the wafer, a thickness of the pattern, a critical dimension of the pattern or a depth of the pattern.

In order to provide a feature of an embodiment of the present invention, there is also provided a method for recognizing a pattern of an alignment mark on a wafer including providing the wafer into an alignment apparatus; identifying a key alignment mark in an alignment mark region of the wafer; capturing an image by magnifying only the identified key alignment mark; extracting an alignment mark pattern by a pattern recognition of the captured image; and establishing the extracted alignment mark pattern as a reference mark.

According to an embodiment of the present invention, a mis-recognition of the pattern or a failure to recognize the pattern may be minimized so that a measurement apparatus can accurately measure the pattern through the precise pattern recognition, and the operation efficiency of the measurement apparatus can be improved.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Korean Patent Application No. 2002-49261, filed on Aug. 20, 2002, and entitled: "Method for Recognizing a Pattern of an Alignment Mark on a Wafer," is incorporated by reference herein in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals identify similar or identical elements throughout.

Figure 1:
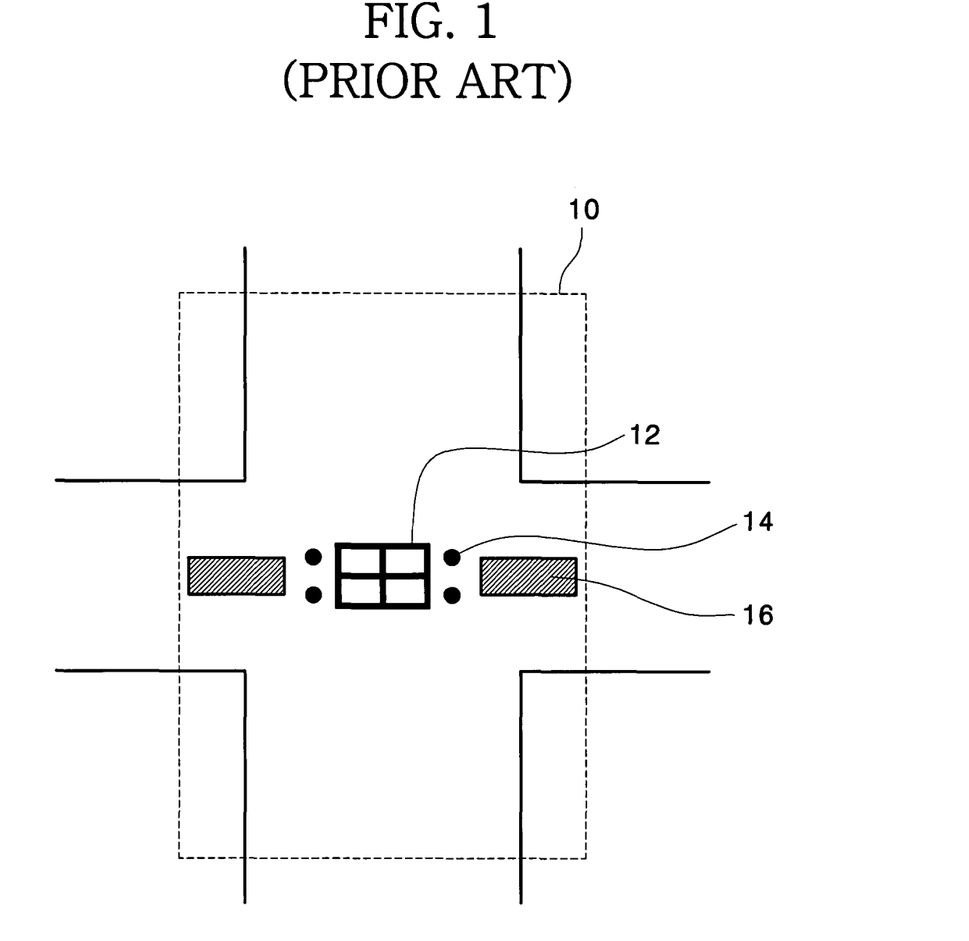
FIG. 1 illustrates a schematic plan view of an alignment of measurement devices in a conventional measurement system.

FIG. 1 illustrates a schematic plan view of an alignment of measurement devices in a conventional measurement system.

Referring to FIG. 1, the measurement system captures an image of an aligning mark region 10 (represented by a dotted line) at a low magnification by controlling a lens part corresponding to a wafer. The aligning mark region 10 includes a central key alignment mark 12, a first mark 14, and a second mark 16. An exemplary conventional measurement system, such as the one shown in FIG. 1, is the F5 measurement system manufactured by the KLA-TENCOR Company. The aligning mark region 10 may be varied somewhat in accordance with a particular measurement system. The aligning mark region 10 of FIG. 1 is only an example. The first mark 14 and the second mark 16 are disposed adjacent to the left and the right sides of the central key alignment mark 12. The first and the second marks 14 and 16 can be provided for aligning reference marks or for marking different die sizes concerning different semiconductor devices.

In the conventional measurement system of FIG. 1, the measurement system locates the first and the second marks 14 and 16, and then recognizes the patterns of the first and the second marks 14 and 16. After the measurement system establishes the set-up position of a measuring point, the measurement identifies a desired position of the measuring point on the basis of the set-up position to obtain desired measuring data.

In the method for detecting the image at a low magnification using the above-mentioned measurement system, the patterns of the marks may not be frequently recognized from the detected image when a film having poor light transmissivity, such as a nitride film, is formed on the aligning mark region 10.

In general, the measurement system captures a gray level image using a charge coupled device (CCD) and then recognizes an aligning mark pattern by processing the data of a black-and-white binarized image after the measurement compares the data of the captured gray level image to a threshold value. However, the measurement system may not recognize the aligning mark pattern if the captured gray level image becomes entirely dark, i.e., when the gray level difference between the pattern and the peripheral region thereof is virtually nonexistent. Although the user attempts to establish the reference of the aligning mark pattern, an alignment failure may occur because the measurement system does not accurately recognize the align mark pattern.

Further, when a particle is present in the aligning mark pattern region 10, the particle may be mistaken for the aligning mark pattern because the particle is generally captured as a black level image. Furthermore, the measurement system may mistake the particle for the pattern during recognizing the pattern since the measurement system captures the aligning mark pattern region 10 at the low magnification.

As described above, the method for recognizing the aligning mark pattern at a low magnification has several disadvantages.

First, the entire semiconductor manufacturing process may fail when a user fails to note that the measurement apparatus did not execute the alignment process. When an alignment failure occurs, a run flow may not perform so that the time for the alignment increases because the user must now reset the measurement apparatus.

Second, the alignment may not be exactly performed so that the mis-recognized data relative to an undesired region or an unexpected region of the wafer might be obtained. The measuring process may be delayed when an interlock is caused by the increase in the time for the alignment and the mis-recognized data.

Third, as the user repeatedly checks and resets the measurement apparatus, a time for measuring the parameters of the wafer may increase, and an operation ratio of the measurement apparatus may decrease.

Fourth, with respect to technical problems, if a thick film or a semi-transparent film is formed on the wafer, the key alignment mark may not be exactly recognized or an alignment failure during the measuring process may occur more than twice as often as during a general manufacturing process.

Furthermore, the measurement apparatus may not recognize the key alignment pattern though the wafer matches with the measurement apparatus by one to one, or the difference of the pattern recognition between the measurement apparatuses may occur. That is, when the folder measured by one measurement apparatus is copied to another measurement apparatus, the measurement apparatus may not measure the parameters relative to the wafer with the copied folder.

In general, when the wafer is initially loaded in the measurement apparatus during the monitoring the thickness of the wafer or particles on the wafer, a key alignment is recognized by comparing a key alignment pattern previously recognized in the measurement apparatus for an exposure process to the pattern on the wafer loaded in the measurement apparatus. The wafer shot size of a related semiconductor device is found such that the shot to be measured is selected after the measurement apparatus recognizes the formation of the shot on the wafer using the found shot size. Then, the measurement apparatus starts the desired measurement with respect to the wafer. Hence, the present invention provides a method for precisely setting the key alignment pattern to the measurement apparatus.

Figure 2:
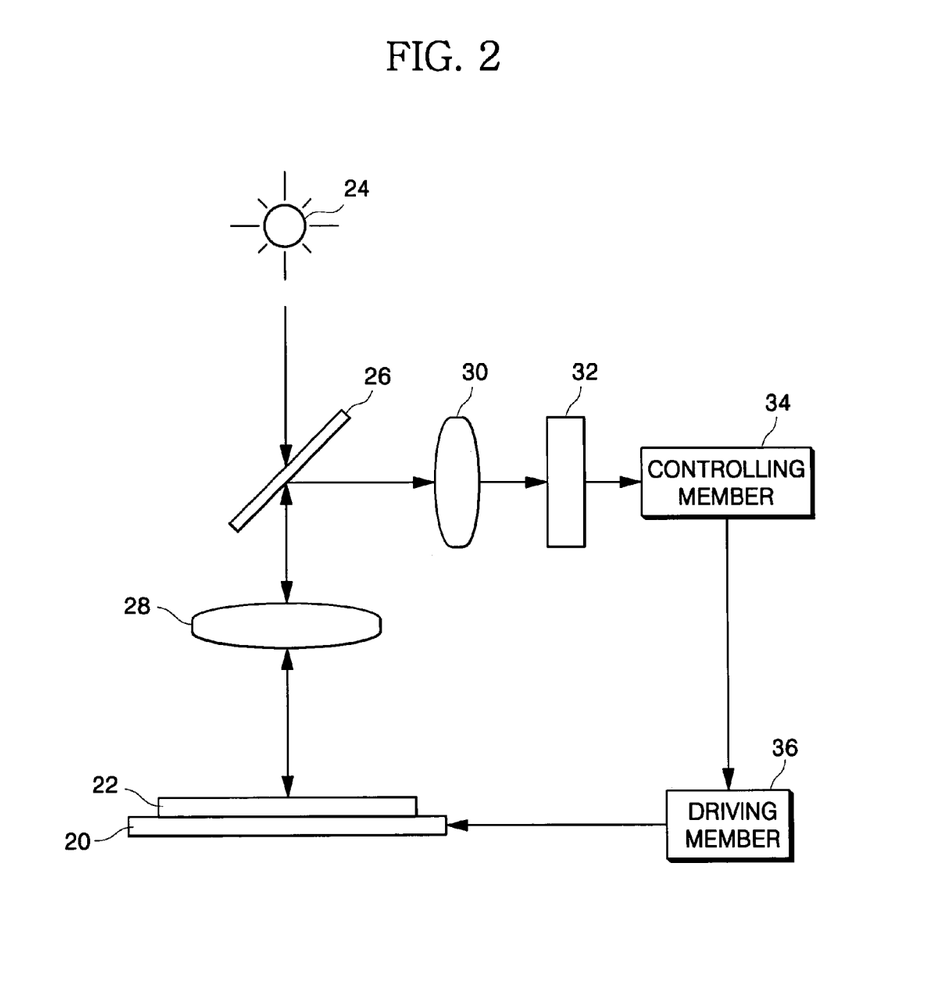
FIG. 2 illustrates a schematic view of an alignment optical apparatus of a measurement system according to an embodiment of the present invention.

FIG. 2 illustrates a schematic view of an optical alignment apparatus of a measurement system according to an embodiment of the present invention.

Referring to FIG. 2, the measurement apparatus for a semiconductor wafer includes an optical measurement system to recognize an aligning mark on the wafer. The optical measurement system includes a light source 24 for providing light to a wafer 22 disposed on a wafer stage 20. The light from the light source 24 passes through a half mirror 26, and then is focused on the wafer 22 by a lens 28.

After the light reflected from the wafer 22 again encounters the half mirror 26, the light incident upon the half mirror 26 is reflected by approximately 90° so that the light is focused on the CCD sensor 32 through a lens 30. The CCD sensor 32 transforms the incident light using a photoelectric conversion method into two-dimensional gray level image data.

A controlling member 34 recognizes the converted image data as a pattern through the use of a pattern recognition algorithm according to the present invention, and the controlling member 34 controls a driving member 36 to adjusting the alignment of the wafer 22 in accordance with the result of the pattern recognition or to utilize the result of the pattern recognition as the reference data for measurement.

Figure 3:
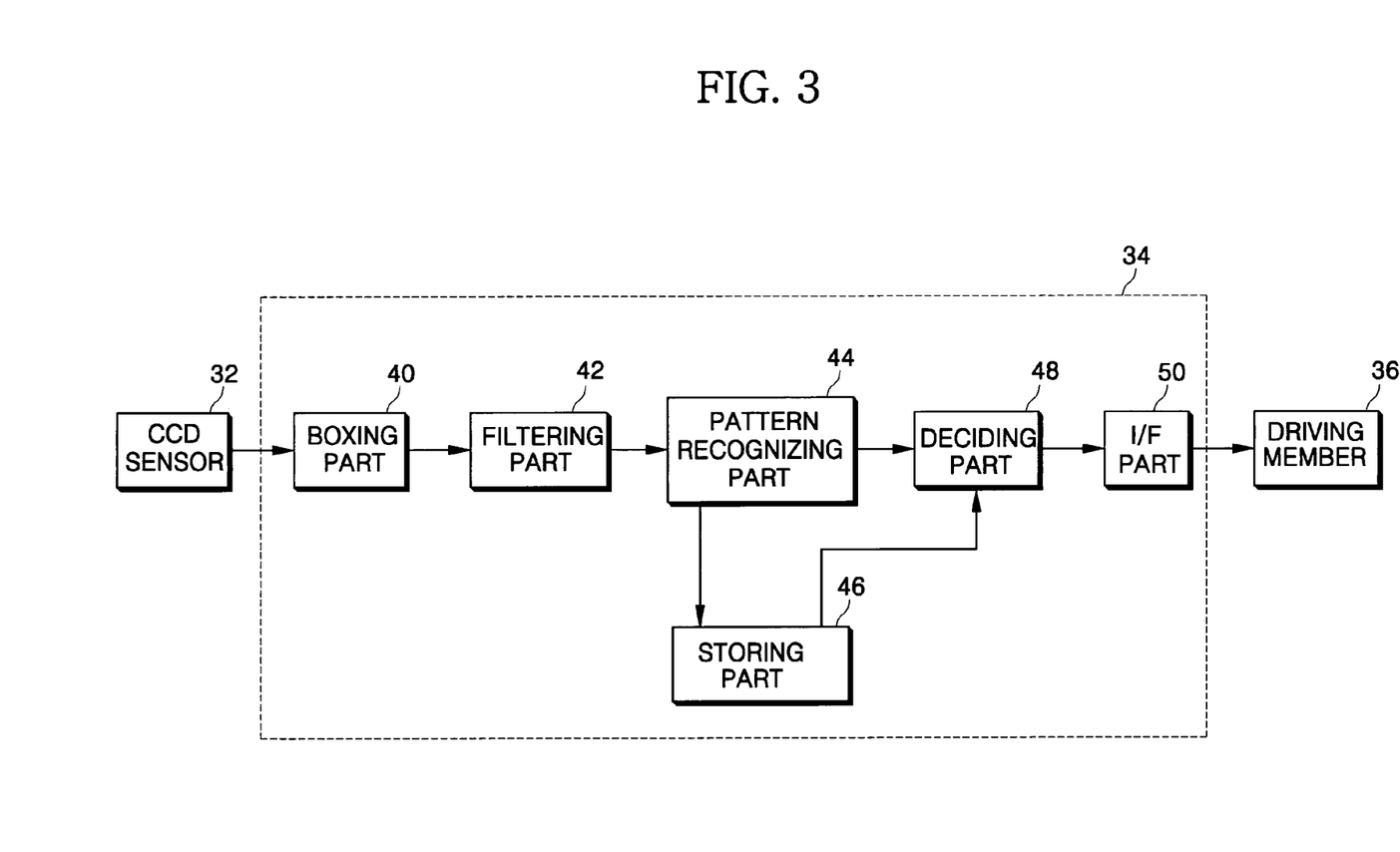
FIG. 3 is a block diagram illustrating the controlling member in FIG. 2.
Figure 4:
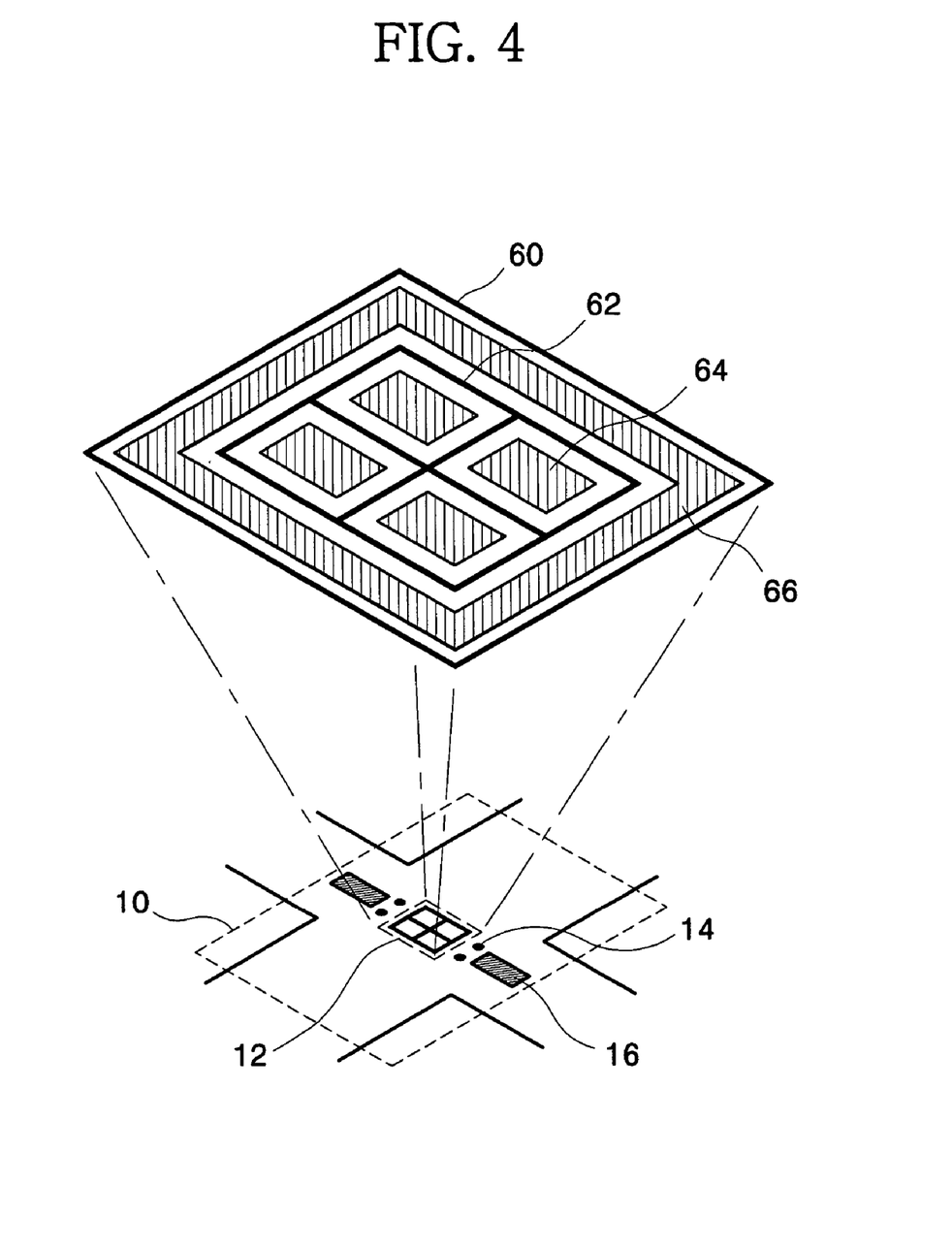
FIG. 4 illustrates an enlarged, elevated perspective view of a method for recognizing a pattern of a key alignment mark according to an embodiment of the present invention.
Figure 5:
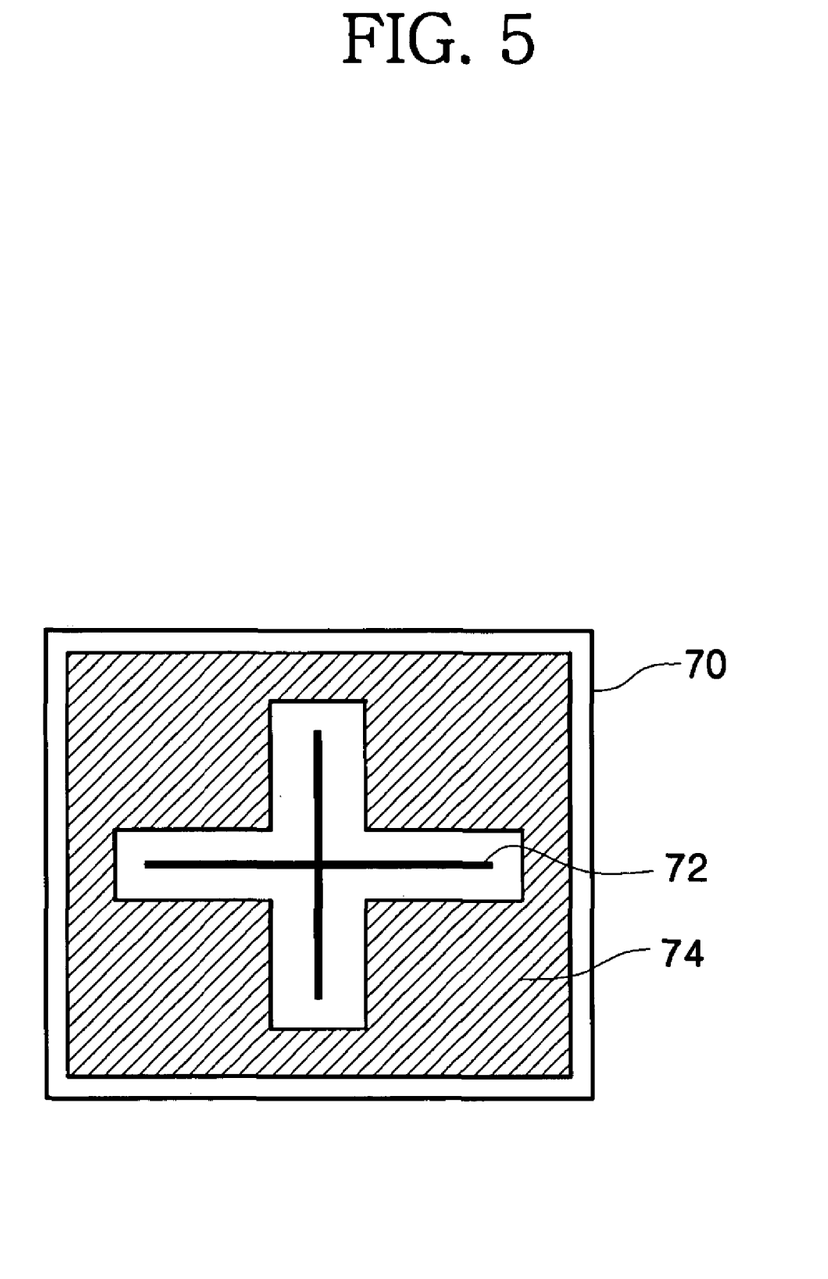
FIG. 5 illustrates an enlarged plan view of a method for recognizing another pattern of a key alignment mark according to an embodiment of the present invention.

FIG. 3 is a block diagram illustrating the controlling member in FIG. 2. FIG. 4 illustrates an enlarged, elevated perspective view of a method for recognizing a pattern of a key alignment mark according to an embodiment of the present invention. FIG. 5 illustrates an enlarged plan view of a method for recognizing another pattern of a key alignment mark according to an embodiment of the present invention.

Referring to FIG. 3, the controlling member 34 includes a boxing part 40, a filtering part 42, a pattern recognizing part 44, a storing part 46, a deciding part 48, and an interfacing (I/F) part 50.

The boxing part 40 boxes in a specific region among the image data inputted from the CCD sensor 32 such that the boxing part 40 extracts the image data in a box region and discards any other data. In this case, the box regions 60 and 70, as shown in FIGS. 4 and 5, respectively, define the region including key alignment marks 62 and 72 of FIGS. 4 and 5, respectively, as the region enlarged at a high magnification. Since a highly magnified region 60 and 70 includes only a key alignment mark, as compared to a region 10 at a low magnification, the probability of a mis-recognition or a failure to recognize a pattern is decreased, thereby improving accurate recognition.

The filtering part 42 deletes the image data of the peripheral region beyond the key alignment mark region from among the box-processed image data. When a key alignment mark 62 has a window frame shape, as in FIG. 4, the image data included in the inner space 64 and the outer space 66 of the key alignment mark 62 (represented by cross-hatching) are deleted. Alternately, when a key alignment mark 72 has a square shape with a cross inside, as in FIG. 5, the image data included in the outer space 74 of the key alignment mark 72 (represented by cross-hatching) is deleted. The filtering part 42 performs the above-described filtering process to delete the undesired image data so that a mis-recognition or a failure to recognize the pattern caused by a particle, for example, can be minimized.

The pattern recognizing part 44 recognizes a final key alignment pattern by binarizing the image data of the filtered key alignment mark. The pattern recognizing part outputs the final key alignment pattern to the storing part 46 and the deciding part 48.

The storing part 46 stores the recognized key alignment mark pattern as a reference mark and outputs the recognized key alignment mark pattern to the deciding part 48.

The deciding part 48 compares and decides the set reference mark in the storing part 46 relative to the present mark pattern recognized by the pattern recognizing part 44.

The interfacing (I/F) part 50 transfers a driving control signal in accordance with the decision result of the deciding part 48 to the driving member 36 that drives the wafer stage 20.

Figure 6:
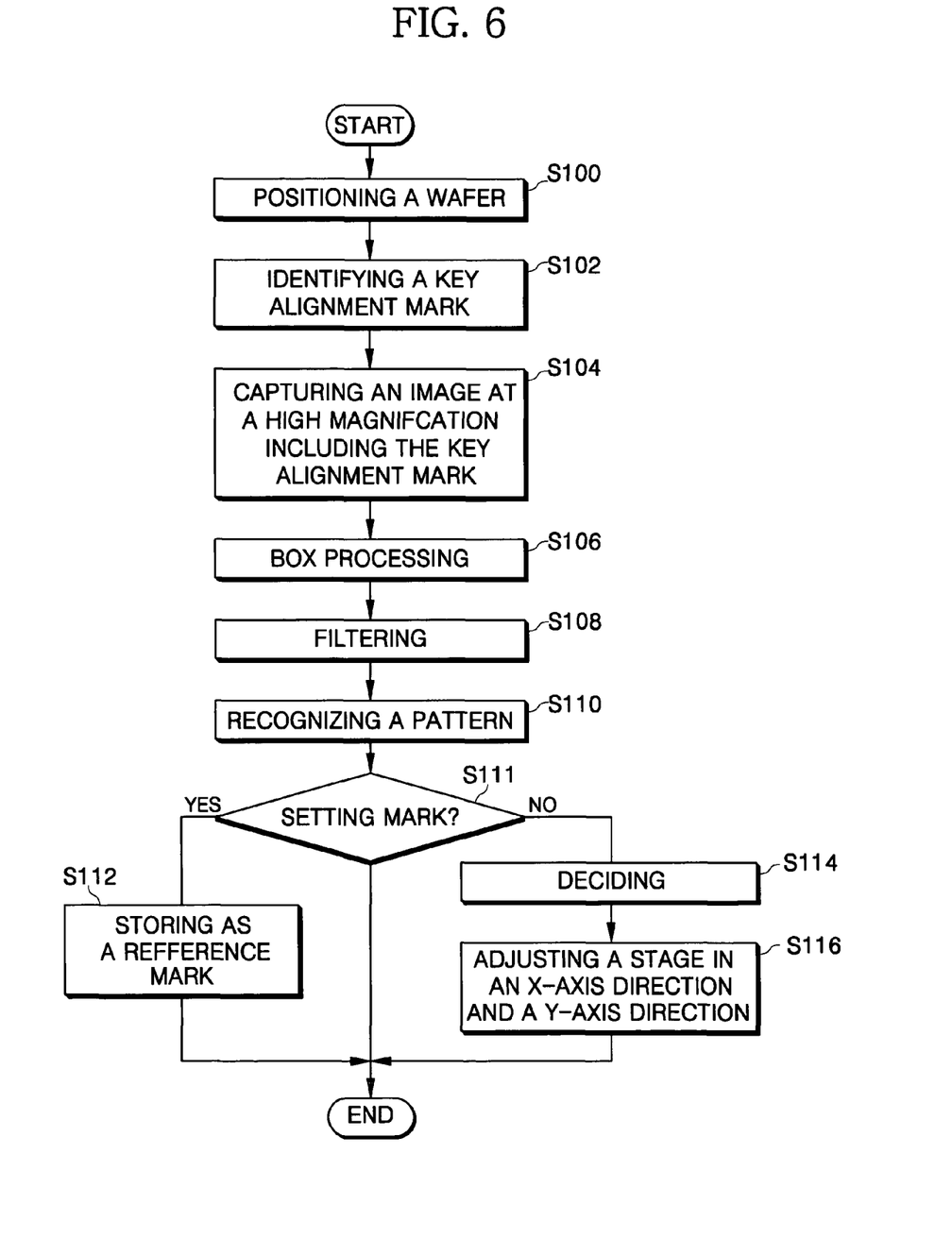
FIG. 6 is a flow chart illustrating a method for recognizing a pattern of a key alignment mark according to an embodiment of the present invention.

The measurement apparatus according to an embodiment of the present having the above-described construction recognizes the alignment pattern using the algorithm as shown in FIG. 6.

FIG. 6 is a flow chart illustrating a method for recognizing the pattern of the key alignment mark according to an embodiment of the present invention.

Referring to FIG. 6, in step S100, a wafer 22 is positioned on the wafer stage 20. In step S102, the key alignment mask is identified according as the wafer 22 is moved in an X-axis direction and a Y-axis direction. At this time, a related pattern is recognized during a set-up of the measurement apparatus for measuring parameters relative to a particle on the wafer, a thickness of the pattern, a critical dimension of the pattern or a depth of the pattern. After the key alignment mark is identified, the region including the key alignment mark is magnified at a high magnification, preferably, at least about four magnifications, so that an image is captured through a CCD sensor in step S104.

In step S106, the captured image data of high magnifications is box processed in the boxing part 40 so that a pattern recognition region is defined.

Then, in step S108, the filtering process is executed in the pattern recognition region to delete the data from undesired regions in the pattern recognition region in accordance with the shape of the key alignment mark.

In step S110, the pattern of the key alignment mark is recognized according to binarizing a gray level data through a pattern recognizing process of the filtered image data.

In step S111, the recognized pattern is checked to determine whether the pattern represents an apparatus setting condition or an aligning condition.

If the recognized pattern is determined to be an apparatus setting condition, then in step S112, the recognized pattern is stored in the storing part 46 as an alignment reference mark.

If, however, in step S111, the recognized pattern is determined to be an aligning condition, then in step S114, the present recognized pattern is compared and decided relative to the set pattern in the storing part 46 so that the driving member 36 for driving the stage 20 is controlled to perform an alignment adjustment in accordance with the decision result in step S116.

As it is described above, according to the present invention, after a key alignment mark is detected at a high magnification, the captured image data obtained from the key alignment mark is defined as a specific region, and then the images from undesired regions in the defined region are deleted. Therefore, the mis-recognition of the pattern or the failure to recognize the pattern can be minimized so that a measurement apparatus can accurately measure the pattern through a precise pattern recognition, and the operation efficiency of the measurement apparatus can be improved.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method for recognizing a pattern of an alignment mark on a wafer, the method comprising:
    providing the wafer into a measurement apparatus;
    capturing image data corresponding to a first alignment mark region of the wafer;
    determining a shape of the alignment mark within the first alignment mark region;

deleting a subset of the captured image data that corresponds to a portion of the first alignment mark region that surrounds the alignment mark;

extracting an alignment mark pattern by a pattern recognition of the captured image data; and establishing the extracted alignment mark pattern as a reference mark, wherein the pattern recognition is performed on a subset of the captured image data corresponding to the shape of the alignment mark.

2. The method for recognizing a pattern of an alignment mark on a wafer as claimed in claim 1, further comprising:

recognizing a related alignment mark pattern in a second alignment mark region of the wafer at a first magnification, the second alignment mark region including the first alignment mark region and at least one related alignment mark disposed outside the first alignment mark region;

wherein the captured image data corresponding to the first alignment mark region is captured at four or more times the first magnification.

3. The method for recognizing a pattern of an alignment mark on a wafer as claimed in claim 2, wherein data corresponding to the at least one related alignment mark is not used in the pattern recognition.

4. The method for recognizing a pattern of an alignment mark on a wafer as claimed in claim 1, wherein the image data is captured by the measurement apparatus that includes a controlling member.

5. The method for recognizing a pattern of an alignment mark on a wafer as claimed in claim 4, wherein the controlling member controls a driving member to adjust alignment of the wafer in accordance with the pattern recognition.

6. The method for recognizing a pattern of an alignment mark on a wafer as claimed in claim 1, wherein the image data is captured with a CCD sensor.

7. The method for recognizing a pattern of an alignment mark on a wafer as claimed in claim 6, wherein the CCD sensor transforms incident light with a photoelectric conversion method into two-dimensional gray level image data.

8. The method for recognizing a pattern of an alignment mark on a wafer as claimed in claim 1, wherein:

the first alignment mark region is a box region that includes the alignment mark, and the deleted subset of image data includes data corresponding to two or more discontinuous portions of the box region.

9. The method for recognizing a pattern of an alignment mark on a wafer as claimed in claim 1, wherein:

the alignment mark has a window frame shape that encloses one or more non-mark regions, and the deleted subset of image data includes data corresponding to the one or more non-mark regions.

10. The method for recognizing a pattern of an alignment mark on a wafer as claimed in claim 1, wherein the alignment mark has a cross shape, and the deleted subset of image data corresponds to a continuous region that encloses the cross shape.

11. The method for recognizing a pattern of an alignment mark on a wafer as claimed in claim 10, wherein the continuous region has a continuous outer perimeter having a first shape and a continuous inner perimeter having a second shape, wherein the second shape is different from the first shape.

12. The method for recognizing a pattern of an alignment mark on a wafer as claimed in claim 1, wherein the subset of the captured image data corresponds to a window frame shape.

13. The method for recognizing a pattern of an alignment mark on a wafer as claimed in claim 1, wherein the subset of the captured image data corresponds a cross shape.

* * * * *